United States Patent
Moon et al.

(10) Patent No.: US 7,420,941 B2
(45) Date of Patent: Sep. 2, 2008

(54) MOBILE COMMUNICATION SYSTEM AND MOBILE STATION

(75) Inventors: Sung Uk Moon, Yokohama (JP); Yuki Takeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 191 days.

(21) Appl. No.: 11/200,099

(22) Filed: Aug. 10, 2005

(65) Prior Publication Data
US 2006/0034215 A1    Feb. 16, 2006

(30) Foreign Application Priority Data
Aug. 10, 2004    (JP)    ............... P2004-233891

(51) Int. Cl.
*H04Q 7/00*    (2006.01)
(52) U.S. Cl. .................. 370/328; 370/331; 370/342
(58) Field of Classification Search ............. 370/328, 370/7.1–7.2, 337, 278, 331, 473; 455/454, 455/130, 466, 458, 414.2, 67.11, 414.3, 432.1; 709/230
See application file for complete search history.

(56) References Cited

U.S. PATENT DOCUMENTS

| | | | |
|---|---|---|---|
| 6,351,647 B1 * | 2/2002 | Gustafsson | ............... 455/466 |
| 6,710,702 B1 * | 3/2004 | Averbuch et al. | ............ 340/7.1 |
| 2003/0014360 A1 * | 1/2003 | Arditti et al. | ................ 705/39 |
| 2004/0147251 A1 * | 7/2004 | Nakayama et al. | ...... 455/414.2 |
| 2005/0064821 A1 * | 3/2005 | Hedberg et al. | ........ 455/67.11 |
| 2005/0090235 A1 * | 4/2005 | Vermola et al. | ........ 455/414.3 |
| 2005/0170842 A1 * | 8/2005 | Chen | ................... 455/454 |
| 2005/0176445 A1 * | 8/2005 | Qu et al. | ................ 455/458 |
| 2006/0083184 A1 * | 4/2006 | Haumont et al. | ........... 370/278 |
| 2006/0154627 A1 * | 7/2006 | Wang et al. | ................ 455/130 |
| 2006/0248206 A1 * | 11/2006 | Moerdijk et al. | ........... 709/230 |

FOREIGN PATENT DOCUMENTS

| | | |
|---|---|---|
| CN | 1450750 A | 10/2003 |
| JP | 2000-125332 | 4/2000 |
| JP | 2003-348232 | 12/2003 |
| WO | WO 2004/030293 A1 | 4/2004 |

OTHER PUBLICATIONS

"3rd Generation Partnership Project; Technical Specification Group Services and System Aspects; Multimedia Broadcast/Multicast Service (MBMS); Architecture and Functional Description (Release 6)", 3GPP TS 23.246 V6.2.0 (Mar. 2004), pp. 1-40.

(Continued)

*Primary Examiner*—Tan Trinh
(74) *Attorney, Agent, or Firm*—Oblon, Spivak, McClelland, Maier & Neustadt, P.C.

(57) ABSTRACT

In a mobile communication system for transmitting broadcast data and/or multicast data to a mobile station, a second network is configured to notify the mobile station of a service identifier of the second network for identifying the broadcast data and/or multicast data available in the second network, when the mobile station performs roaming from a first network to the second network; and the mobile station is configured to receive the broadcast data and/or multicast data from the second network, by using the service identifier of the second network.

2 Claims, 6 Drawing Sheets

OTHER PUBLICATIONS

"3rd Generation Partnership Project; Technical Specification Group Services and System Aspects; Multimedia Broadcast/Multicast Service (MBMS); Architecture and functional description (Release 6)", 3GPP TS 23.246 V.6.3.0, XP-002354168, Jun. 2004, pp. 1-41.
"MBMS: TMGI and roaming issues", Alcatel, 3GPP TSG-SA WG2#35, Tdoc S2-033380, XP-002354169, Oct. 27-31, 2003 pp. 1-4.
"Addition of IMEISV for Automatic Device Detection function", Ericsson, 3GPP TSG SA WG2 Meeting #38, S2-041016, XP-002354170, Feb. 16-20, 2004, pp. 1-40.
"TMGI and roaming", Alcatel, 3GPP TSG-SA2 #35, Tdoc S2-033381, XP-002354171, Aug. 27-31, 2003, pp. 1-7.

"3rd Generation Partnership Project: Technical Specification Group Services and SYstem Aspects; Multimedia Broadcast/Multicast Service (MBMS); Architecture and functional description (Release 6)", 3GPP TS 23.246 V.6.3.0, XP-002354168, Jun. 2004, pp. 1-41.
"MBMS: TMGI and roaming issues", Alcatel, 3GPP TSG-SA WG2#35, Tdoc S2-033380, XP-002354169, Oct. 27-31, 2003 pp. 1-4.
"Addition of IMEISV for Automatic Device Detection funtion", Ericsson, 3GPP TSG SA WG2 Meeting #38, S2-041016, XP-002354170, Feb. 16-20, 2004, pp. 1-40.
"TMGI and roaming", Alcatel, 3GPP TSG-SA2 #35, Tdoc S2-03381, XP-002354171, Aug. 27-31, 2003, pp. 1-7.

* cited by examiner

MOBILE COMMUNICATION SYSTEM AND MOBILE STATION

CROSS REFERENCE TO RELATED APPLICATION

This application is based upon and claims the benefit of priority from the prior Japanese Patent Application No. P2004-233891, filed on Aug. 10, 2004; the entire contents of which are incorporated herein by reference.

BACKGROUND OF THE INVENTION

1. Field of the Invention

The present invention relates to a mobile communication system for transmitting broadcast data and/or multicast data to a mobile station, and to a mobile station used in such a mobile communication system.

2. Description of the Related Art

Conventionally, there is an MBMS (Multimedia Broadcast/Multicast Service) defined in 3GPP ($3^{rd}$ Generation Partnership Project) as the technique of transmitting broadcast data and/or multicast data to a mobile station.

In the MBMS, a service announcement is defined to include a "TMGI" (Temporary Mobile Group Identify). The TMGI is a service identifier for identifying broadcast data and/or multicast data available in each network.

A mobile station is defined to be able to receive desired broadcast data and/or multicast data by setting a TMGI for identifying the desired broadcast data and/or multicast data.

However, in the conventional mobile communication system, when a mobile station performs roaming between a plurality of networks, a means for acquiring the above mentioned TMGI in a roaming destination network is not defined.

Therefore, there is a problem in that the mobile station is not able to receive desired broadcast data and/or multicast data in the roaming destination network.

In other words, as illustrated in FIG. 1, when a mobile station MS#A which manages a service announcement #A including a TMGI for identifying broadcast data and/or multicast data available in an operator network A has performs roaming to an operator network B, means for acquiring a service announcement #B including a TMGI for identifying broadcast data and/or multicast data available in the operator network B is not defined.

Therefore, there is a problem in that the mobile station MS#A is not able to receive desired broadcast data and/or multicast data in the operator network B.

Further, as illustrated in FIG. 2, in the conventional mobile communication system, the TMGI is configured of a "roaming portion" for identifying an operator in the mobile communication system and a "local portion" for identifying a service(s) provided by the operator.

Thus, when the TMGI including the above-described roaming portion and local portion is utilized, the TMGI value becomes large, and processing load on a radio communication area between a radio controller and a mobile station to establish sessions for transmitting and receiving broadcast data and/or multicast data is increased.

Hence, in order to reduce the processing load on the radio communication area, the conventional mobile communication system is configured to identify the broadcast data and/or the multicast data only by the local portion in the same operator network.

However, the thus configured conventional mobile communication system may cause a problem in that the same local number may be assigned to different broadcast data pieces and/or multicast data pieces in a plurality of networks, and if a mobile station performs roaming with holding a TMGI for the roaming source network, it becomes difficult to specify broadcast data and/or multicast data available in the roaming destination network.

BRIEF SUMMARY OF THE INVENTION

The present invention has been made in view of the foregoing problems, and it is an object of the invention to provide a mobile communication system capable of transmitting broadcast data and/or multicast data to a mobile station roaming between a plurality of networks, and such a mobile station used in this system.

A first aspect of the present invention is summarized as a mobile communication system for transmitting broadcast data and/or multicast data to a mobile station, wherein a second network is configured to notify the mobile station of a service identifier of the second network for identifying the broadcast data and/or multicast data available in the second network, when the mobile station performs roaming from a first network to the second network; and the mobile station is configured to receive the broadcast data and/or multicast data from the second network, by using the service identifier of the second network.

In the first aspect, the mobile station can be configured to delete a service identifier of the first network for identifying the broadcast data and/or multicast data available in the first network, when the mobile station receives the service identifier of the second network.

A second aspect of the present invention is summarized as a mobile station includes a controller configured to control a service identifier for identifying broadcast data and/or multicast data available in a predetermined network; a roaming processor configured to perform roaming between a plurality of networks; an acquirer configured to acquire, from a second network, a service identifier of the second network for identifying the broadcast data and/or multicast data available in the second network, when the mobile station performs roaming from a first network to the second network; and a data receiver configured to receive the broadcast data and/or multicast data from the second network, by using the service identifier of the second network.

In the second aspect, the controller can be configured to delete a service identifier of the first network for identifying the broadcast data and/or multicast data available in the first network, when the acquirer receives the service identifier of the second network.

A third aspect of the present invention is summarized as a mobile communication system for transmitting broadcast data and/or multicast data to a mobile station, wherein the mobile station having a service identifier of a first network for identifying the broadcast data and/or multicast data available in the first network is configured to stop receiving the broadcast data and/or multicast data by using the service identifier of the first network in accordance with an instruction from the first network or a second network, when the mobile station performs roaming from the first network to a second network.

A fourth aspect of the present invention is summarized as a mobile communication system for transmitting broadcast data and multicast data to a mobile station, wherein the mobile station having a service identifier of a first network for identifying the broadcast data and/or multicast data available in the first network is configured to stop receiving the broadcast data and/or multicast data by using the service identifier of the first network in accordance with its own judgment, when the mobile station performs roaming from the first network to a second network.

DETAILED DESCRIPTION OF THE INVENTION (Configuration of a Mobile Communication System According a First Embodiment of the Present Invention)

A configuration of a mobile communication system according to the first embodiment of the present invention will be described with reference to FIGS. 3 and 4.

The mobile communication system according to the present embodiment is configured to transmit broadcast data and/or multicast data to a mobile station MS.

Figure 1:
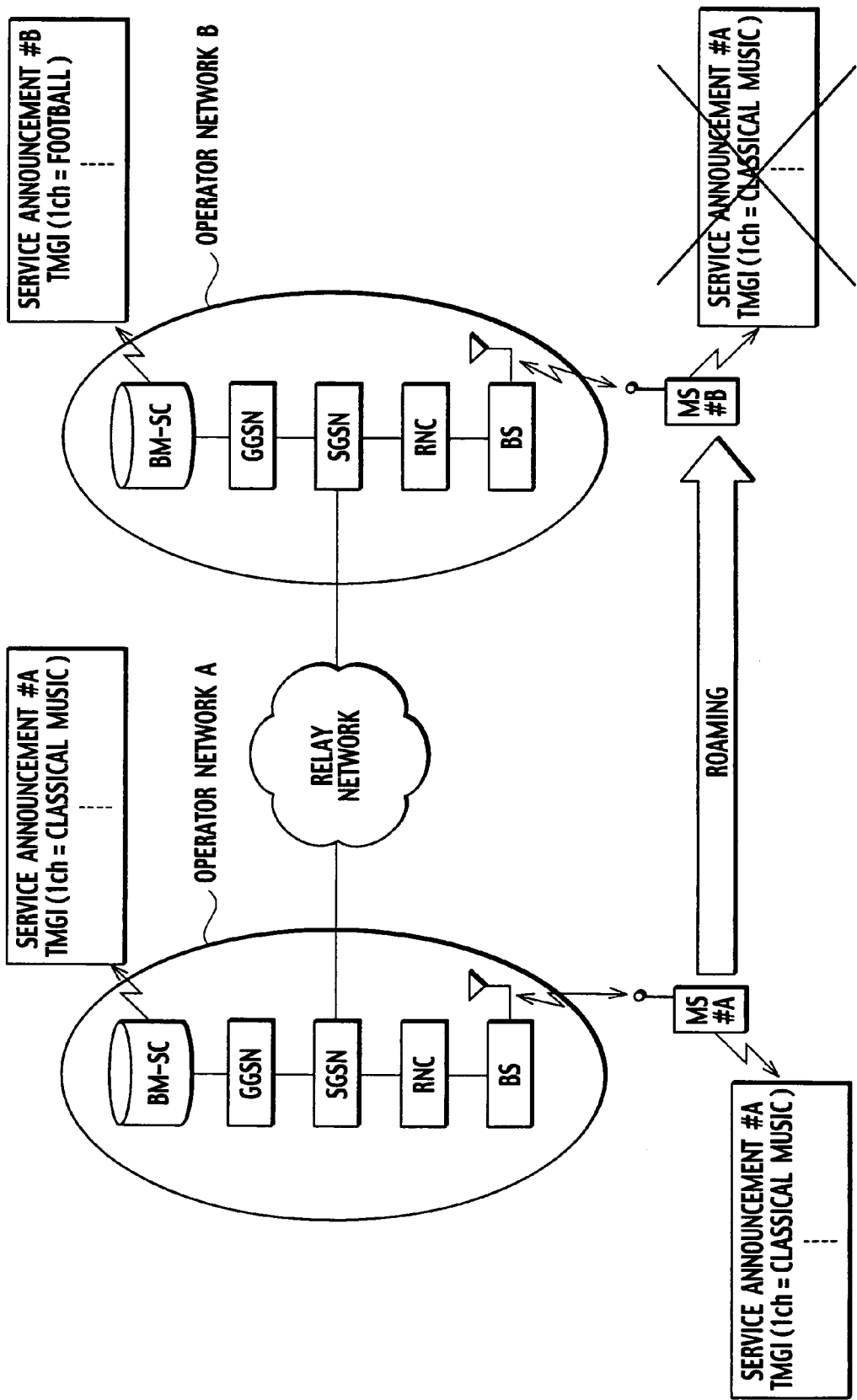
FIG. 1 is a view illustrating an overall configuration of a mobile communication system according to the related art.
Figure 2:
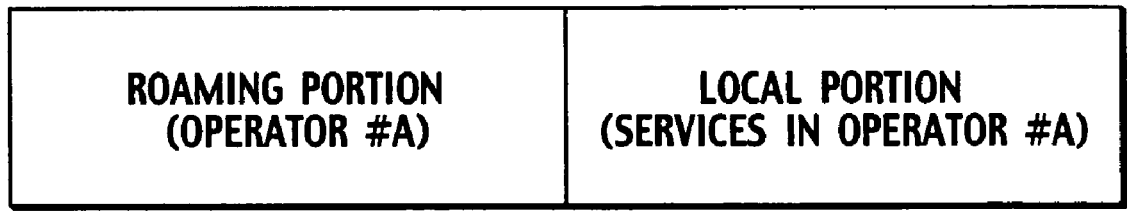
FIG. 2 is a view illustrating an example of a TMGI format used in the mobile communication system according to the related art.
Figure 3:
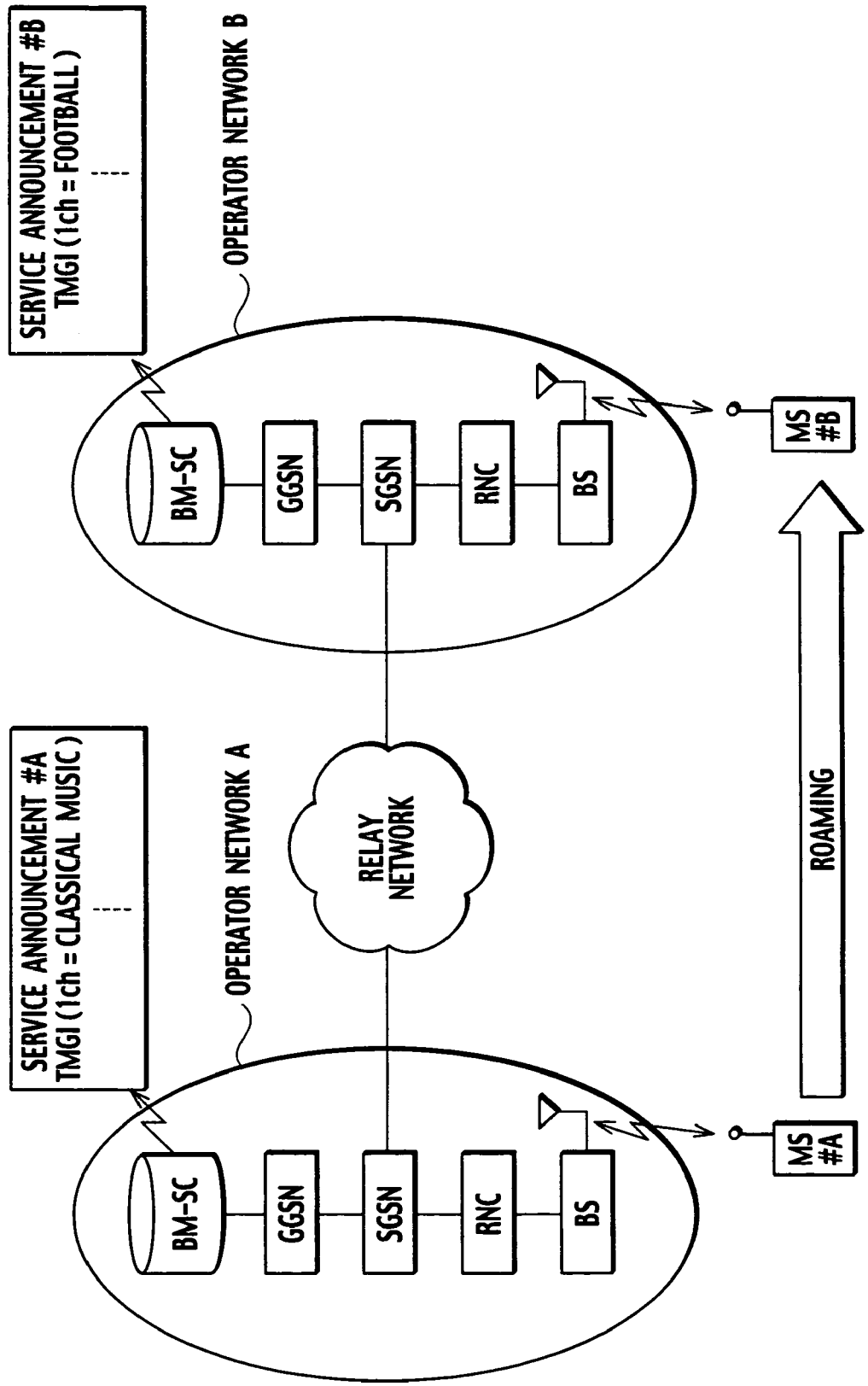
FIG. 3 is a view illustrating an overall configuration of a mobile communication system according to a first embodiment of the present invention.

As shown in FIG. 3, the mobile communication system according to the present embodiment includes an operator network A, an operator network B and a relay network.

The present embodiment deals with the case where a mobile station MS#A which has a service contract with the operator network A performs roaming from the operator A network (first network) to the operator network B (second network).

Each of the operator networks has arranged therein a Broadcast Multicast Service Center (BM-SC), a Gateway GRPS Support Node (GGSN), a Serving GRPS Support Node (SGSN), a radio network controller (RNC) and a base station (BS).

The BM-SC is configured to generate a service announcement including a TMGI (Temporary Mobile Group Identify) for identifying the broadcast data and/or multicast data available in each network, and to notify the service announcement to the mobile station MS#A.

Figure 4:
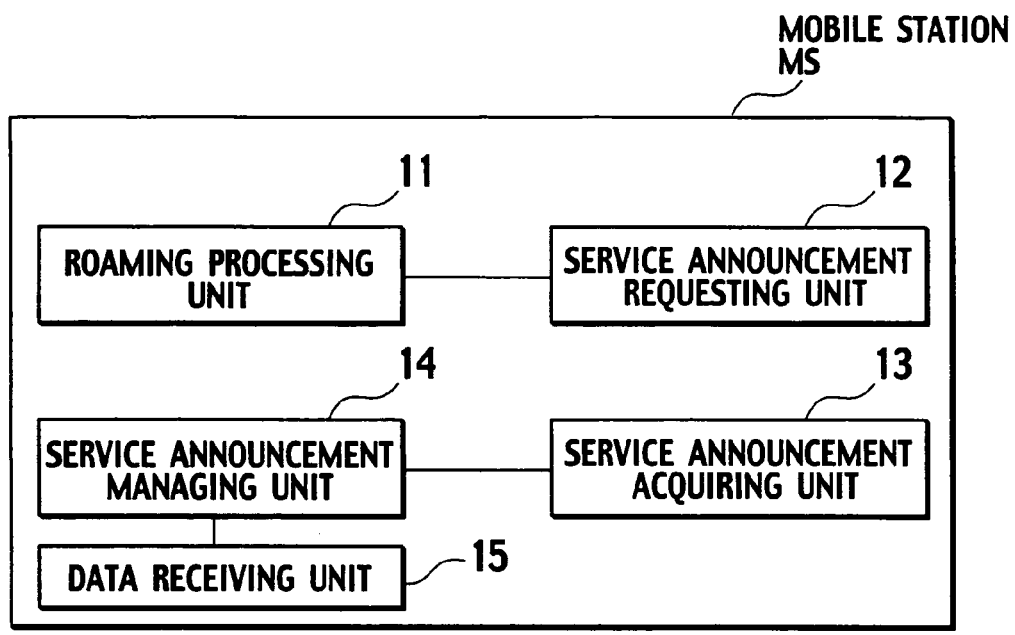
FIG. 4 is a functional block diagram illustrating a mobile station according to the first embodiment of the present invention.

As shown in FIG. 4, the mobile station MS#A includes a roaming processing unit 11, a service announcement requesting unit 12, a service announcement acquiring unit 13, a service announcement managing unit 14 and a data receiving unit 15.

The roaming processing unit 11 is configured to perform processing necessary for roaming from the operator network A (first network) to the operator network B (second network).

The service announcement requesting unit 12 is configured to, when roaming from the operator network A to the operator network B has been performed, transmit to the operator network B a service announcement requesting signal for requesting to send a service announcement #B including a TMGI of the operator network B for identifying the broadcast data and/or multicast data available in the operator network B.

The service announcement requesting unit 12 can be configured to transmit such a service announcement requesting signal as described above to the operator network B only when the operator network B supports the MBMS.

The service announcement acquiring unit 13 is configured to acquire a service announcement #B from the BM-SC (Broadcast Multicast Service Center).

The service announcement managing unit 14 is configured to manage a service announcement including a TMGI for identifying the broadcast data and/or multicast data available in a predetermined network.

The service announcement managing unit 14 can be configured to hold or delete the service announcement #A, when the service announcement #B is received by the service announcement acquiring unit 13.

The data receiving unit 15 is configured to receive the broadcast data and/or multicast data, by using a TMGI which is included in the service announcement.

Specifically, the data receiving unit 15 is configured to receive, from the operator network A or the operator network B, the broadcast data and/or multicast data corresponding to the TMGI set by a user.

Besides, the data receiving unit 15 can be configured to, when the mobile station MS#A has performed roaming from the first network to the second network, stop receiving the broadcast data and/or multicast data using the TMGI of the first network, in accordance with an instruction from the first network or the second network, or in accordance with its own judgment.

Further, when the service announcement managing unit 14 is configured to hold a service announcement #A, and when the mobile station MS#A returns to the first network, the data receiving unit 15 is capable of receiving the broadcast data and/or multicast data without acquiring the service announcement #A again.

(Behavior of the Mobile Communication System According to the First Embodiment of the Present Invention)

Figure 5:
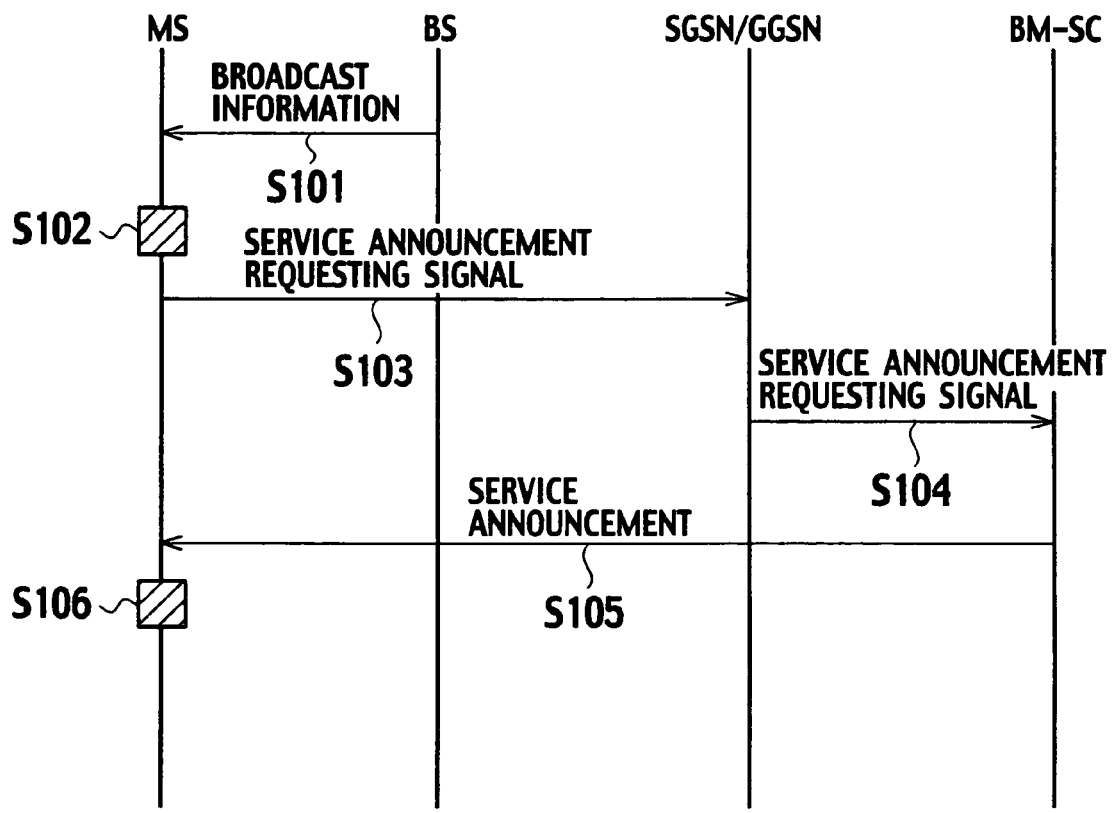
FIG. 5 is a sequence view illustrating the behavior of the mobile communication system according to a first embodiment of the present invention.

Next description is made, with reference to FIG. 5, about the behavior of the mobile communication system according to the first embodiment of the invention.

The example of FIG. 5 illustrates the behavior of the mobile communication system according to this embodiment where the mobile station MS#A has performed roaming from the operator network A to the operator network B.

In the step S101, the base station BS distributes, to the mobile station MS#A, broadcast information including operator identifying information for identifying an operator B and MBMS support information which shows that the operator network B supports the MBMS.

In the step S102, the mobile station MS#A detects, based on the operator identifying information included in the broadcast information, that roaming from the operator network A to the operator network B has been performed, and also detects, based on the MBMS support information included in the broadcast information, that the operator network B supports the MBMS.

In the step S103, the mobile station MS#A transmits to the SGSN/GGSN a service announcement requesting signal for requesting a service announcement #B.

In the step S104, the SGSN/GGSN transmits the service announcement requesting signal transmitted from the mobile station MS#A, to the BM-SC (Broadcast Multicast Service Center).

In the step S105, in reply to the received service announcement requesting signal, the BM-SC notifies the mobile station MS#A of a service announcement #B including a TMGI for identifying the broadcast data and/or multicast data available in the operator network B.

For example, the BM-SC can be configured to notify the mobile station MS#A of a service announcement #B with use of a short message service (SMS) or a multimedia message service (MMS), to notify the mobile station MS#A of a service announcement #B via an e-mail or to notify the mobile station MS#A of a service announcement #B via a web server.

In the step S106, the mobile station MS#A, in response to receiving the service announcement #B, deletes the stored TMGI of the operator network A, and stores the TMGI of the operator network B included in the service announcement #B.

Here, the mobile station MS#A can be configured not to determine whether or not the operator network B supports the MBMS in the step S102, and to transmit a service announcement requesting signal for requesting a service announcement #B in the step S103.

In this case, in the operator network B that does not support the MBMS, the BM-SC does not perform any processing on the service announcement requesting signal (for example, send back a refusal signal).

(Operation/Effect of the Mobile Communication System According to the First Embodiment of the Present Invention)

In the mobile communication system according to the first embodiment, once the mobile station MS#A completes roaming from the operator network A to the operator network B, the mobile station MS#A is notified of a service announcement #B including a TMGI for identifying the broadcast data and/or multicast data available in the operator network B.

Accordingly, the user can recognize a broadcast communication service or a multicast communication service provided in the present network (operator network B) and the mobile station MS#A is capable of receiving desired broadcast data and/or multicast data in the operator network B (roaming destination network).

This consequently brings about enhancement of the convenience for users and, on the other hand, allowing the operator to provide the broadcast communication service or the multicast communication service to the mobile station MS#A which has roamed to the operator network, and making it possible to increase mobile stations MS in number which use the broadcast communication service or the multicast communication service.

In the mobile communication system according to the first embodiment, when the mobile station MS#A has performed roaming, the TMGI for the roaming source network (operator network A) is deleted. Therefore, the broadcast data and/or the multicast data can be identified only by a local portion in each network (each operator network).

(Mobile Communication System According to a Second Embodiment of the Present Invention)

Figure 6:
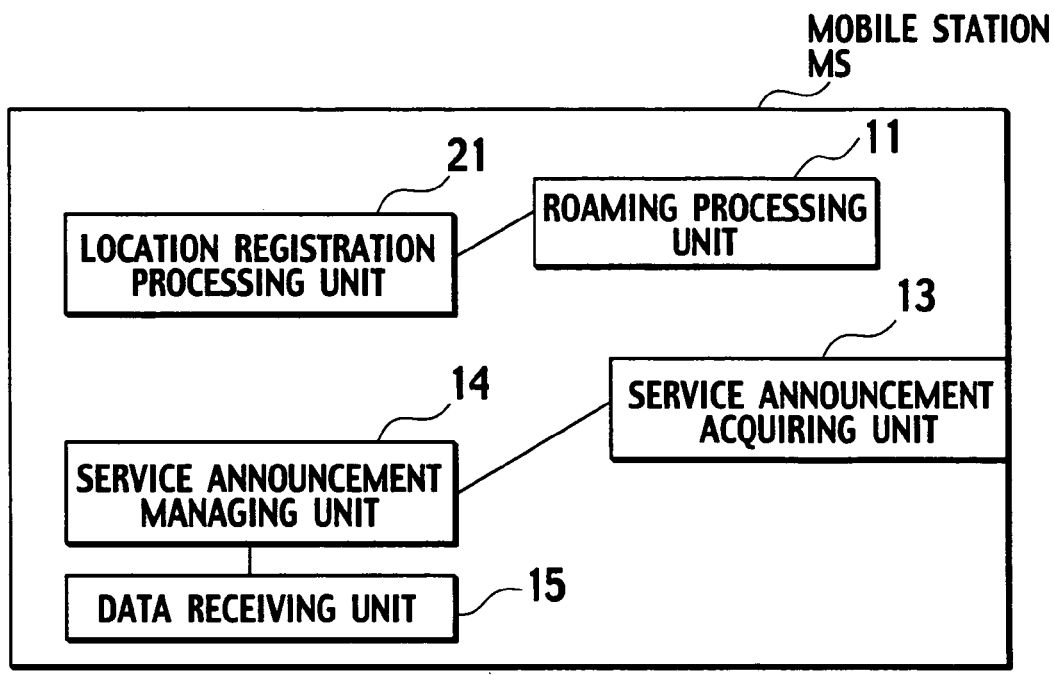
FIG. 6 is a functional block diagram illustrating a mobile station according to a second embodiment of the present invention.
Figure 7:
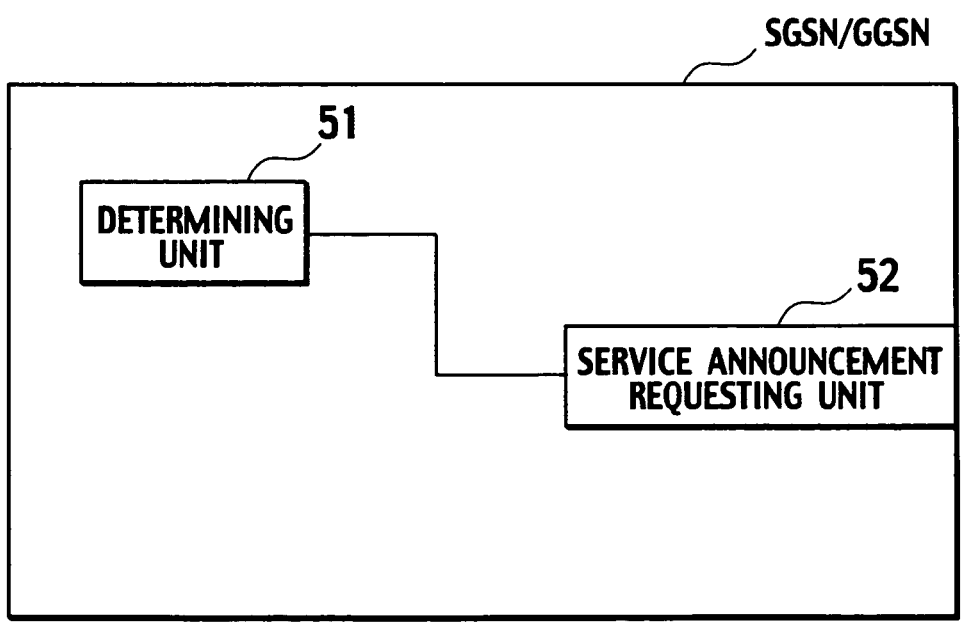
FIG. 7 is a functional block diagram illustrating a SGSN/GGSN according to the second embodiment of the present invention.
Figure 8:
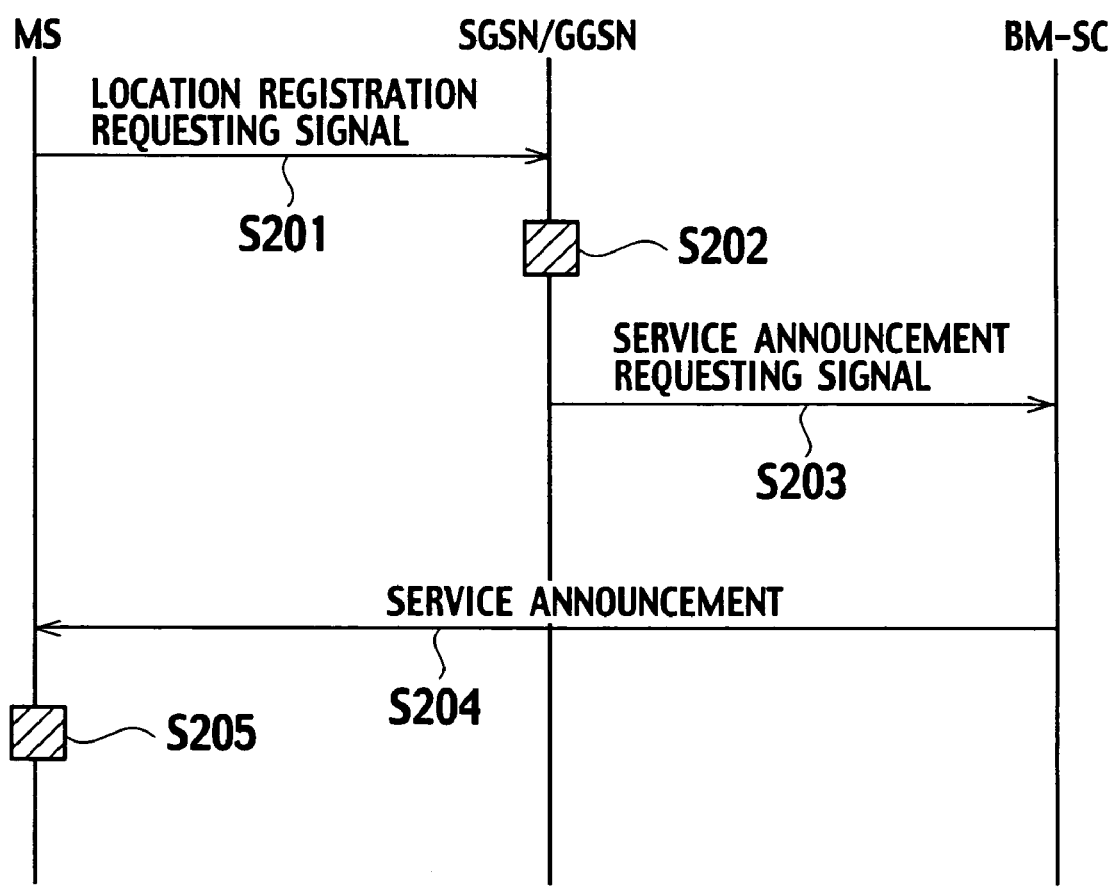
FIG. 8 is a sequence view illustrating the behavior of the mobile communication system according to the second embodiment of the present invention.

Next description is made with reference to FIGS. 6 to 8 about a mobile communication system according to the second embodiment of the present invention.

The description below mainly deals with differences of the mobile communication system according to the second embodiment from the mobile communication system according to the first embodiment.

As illustrated in FIG. 6, the mobile station MS according to the present embodiment includes a roaming processing unit 11, a service announcement acquiring unit 13, a service announcement managing unit 14, a data receiving unit 15 and a location registration processing unit 21.

The location registration processing unit 21 is configured to perform location registration processing, when roaming is performed from the operator network A (first network) to the operator network B (second network).

Specifically, the location registration processing unit 21 is configured to transmit a location registration requesting signal to the SGSN/GGSN, when roaming from the operator network A to the operator network B has performed.

As illustrated in FIG. 7, the SGSN/GGSN according to the present embodiment includes a determining unit 51 and a service announcement requesting unit 52.

The determining unit 51 is configured to determine, based on "IMEI (International Mobile Equipment Identity)" included in the location registration requesting signal transmitted from the mobile station MS#A, whether or not the mobile station MS#A is a mobile station (roamed-in mobile station) roaming into the operator network B.

The IMEI is a unique 15-digit code used to identify an individual GSM mobile telephone (mobile station) to a mobile network. The IMEI can include a TAC (type approval code or type allocation code), an FAC (final assembly code), an SNR (serial number) and a CD (check digit).

The TAC is formed by the first six digits of the IMEI. The TAC identifies the country in which type approval was sought for the phone, as well as the approval number. The FAC identifies the company that produced the mobile station. When the TAC is formed by the first eight digits, the FAC is not included in the IMEI.

The SNR is a six-digit code, which has been uniquely assigned to the specific type of handset (mobile station). The CD is used to check the IMEI for its validity for Phase 2 and Phase 2+ handsets. Phase 1 GSM handset, however, always zero as check digit. Further, the determining unit 51 is configured to determine, based on "IMEISV (International Mobile Equipment Identity and Software Version)" included in the location registration requesting signal transmitted from the mobile station MS#A, whether or not the mobile station MS#A supports the MBMS.

The IMEISV is currently used. The IMEISV offers the possibility of adding the handset's original software version number. The IMEISV adds a two digit SVN (software version number) at the end of the IMEI.

When it is determined that the mobile station MS#A is a roamed-in mobile station and supports the MBMS, the service announcement requesting unit 52 is configured to transmit to the BM-SC (Broadcast Multicast Service Center) a service announcement requesting signal for requesting to transmit to the mobile station MS#A a service announcement #B including a TMGI of the operator network B for identifying the broadcast data and/or multicast data available in the operator network B.

With reference to FIG. 8, the behavior of a mobile communication system according to the second embodiment will be described.

The example of FIG. 8 deals with the behavior of the mobile communication system according to the present embodiment when the mobile station MS#A is roamed from the operator network A to the operator network B.

In the step S201, the mobile station MS#A transmits to the SGSN/GGSN a location registration requesting signal.

In the step S202, the SGSN/GGSN detects, based on "IMEI" included in the location registration requesting signal, that the mobile station MS#A has performed roaming from the operator network A to the operator network B, and also detects, from "IMEISV" included in the location registration requesting signal, that the mobile station MS#A supports MBMS.

In the step S203, the SGSN/GGSN transmits to the BM-SC (Broadcast Multicast Service Center) a service announcement requesting signal for requesting a service announcement #B.

In the step S204, based on the received service announcement requesting signal, the BM-SC notifies the mobile station MS#A of a service announcement #B including a TMGI for identifying the broadcast data and/or multicast data available in the operator network B.

For example, the broadcast multicast service center BM-SC can be configured to notify the mobile station MS#A of a service announcement #B with use of a short message service (SMS) or a multimedia message service (MMS), to notify the mobile station MS#A of a service announcement #B via an-e-mail or to notify the mobile station MS#A of a service announcement #B via a web server.

In the step S205, the mobile station MS#A deletes, in response to receiving of the service announcement #B, the stored TMGI of the operator network A, and stores a TMGI of the operator network B included in the service announcement #B.

As described above, according to the present invention a mobile communication system that is capable of transmitting broadcast data and/or multicast data to a mobile station roaming between a plurality of networks and the mobile station can be provided.

Additional advantages and modifications will readily occur to those skilled in the art. Therefore, the invention in its broader aspects is not limited to the specific details and the representative embodiments shown and described herein. Accordingly, various modifications may be made without departing from the scope of the general inventive concept as defined by the appended claims and their equivalents.

What is claimed is:

1. A mobile communication system for transmitting broadcast data and/or multicast data to a mobile station, comprising:

a second network configured to notify the mobile station of a service identifier generated in the second network for identifying the broadcast data and/or multicast data available in the second network, when the mobile station performs roaming from a first network to the second network; wherein the mobile station is configured to receive the broadcast data and/or multicast data from the second network using the service identifier generated in the second network and delete a service identifier generated in the first network for identifying the broadcast data and/or multicast data available in the first network, when the mobile station receives the service identifier generated in the second network.

2. A mobile station comprising:

a controller configured to control a service identifier for identifying broadcast data and/or multicast data available in a predetermined network;

a roaming processor configured to perform roaming between a plurality of networks;

an acquirer configured to acquire, from a second network, a service identifier generated in the second network for identifying the broadcast data and/or multicast data available in the second network, when the mobile station performs roaming from a first network to the second network; and a data receiver configured to receive the broadcast data and/or multicast data from the second network using the service identifier generated in the second network, wherein the controller is configured to delete a service identifier generated in the first network for identifying the broadcast data and/or multicast data available in the first network, when the acquirer receives the service identifier generated in the second network.

* * * * *